(12) United States Patent
Broome et al.

(10) Patent No.: US 9,246,963 B2
(45) Date of Patent: Jan. 26, 2016

(54) CUSTOM CONTENT INSERTION

(71) Applicant: Comcast Cable Communications, LLC, Philadelphia, PA (US)

(72) Inventors: Gregory Allen Broome, Broomfield, CO (US); Jason Burgess, Highlands Ranch, CO (US); Richard Fliam, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 272 days.

(21) Appl. No.: 13/765,303

(22) Filed: Feb. 12, 2013

(65) Prior Publication Data

US 2014/0226671 A1    Aug. 14, 2014

(51) Int. Cl.
| | |
|---|---|
| H04L 5/14 | (2006.01) |
| H04W 4/00 | (2009.01) |
| H04N 7/10 | (2006.01) |
| H04L 29/06 | (2006.01) |
| H04N 21/45 | (2011.01) |
| H04N 21/20 | (2011.01) |
| H04N 21/81 | (2011.01) |
| H04N 21/433 | (2011.01) |

(52) U.S. Cl.
CPC ........ *H04L 65/4084* (2013.01); *H04L 65/1059* (2013.01); *H04L 65/604* (2013.01); *H04N 21/20* (2013.01); *H04N 21/4331* (2013.01); *H04N 21/4532* (2013.01); *H04N 21/812* (2013.01)

(58) Field of Classification Search
CPC . H04N 7/164; H04N 21/812; H04N 21/4331; H04N 21/4532; H04N 21/814; H04N 21/25883; H04N 7/165; G06Q 20/027; G06Q 20/127; G08B 27/008

USPC ............................................................. 725/7
See application file for complete search history.

(56) References Cited

U.S. PATENT DOCUMENTS

| | | | | |
|---|---|---|---|---|
| 2002/0083043 | A1* | 6/2002 | Hoshi ............... | G06F 17/30867 1/1 |
| 2008/0313669 | A1* | 12/2008 | Acharya ............. | H04L 65/4084 725/34 |
| 2009/0217326 | A1* | 8/2009 | Hasek ................ | H04N 7/17336 725/87 |
| 2010/0094704 | A1* | 4/2010 | Subramanian ......... | G06Q 30/02 705/14.45 |
| 2012/0185368 | A1* | 7/2012 | Schloter ................. | G06Q 40/12 705/30 |
| 2013/0054366 | A1* | 2/2013 | Roundtree ......... | G06Q 30/0269 705/14.55 |
| 2013/0080242 | A1* | 3/2013 | Alhadeff ............ | G06Q 30/0217 705/14.39 |
| 2013/0124311 | A1* | 5/2013 | Sivanandan ............ | G06Q 30/02 705/14.51 |
| 2014/0173650 | A1* | 6/2014 | Mathews ........... | H04N 21/4331 725/32 |

* cited by examiner

*Primary Examiner* — Brian Roberts
*Assistant Examiner* — Abu-Sayeed Haque
(74) *Attorney, Agent, or Firm* — Ballard Spahr LLP

(57) ABSTRACT

Provided are methods and systems for inserting custom content. An example method can comprise receiving, at a first computing device, an insertion instruction over a first non-packet-switching protocol information stream. The method can also comprise querying, by the first computing device, a second computing device in response to receiving the insertion instruction. The method can further comprise receiving, at the first computing device, content over a packet-switching protocol information stream in response to querying the second computing device. The content can be customized for an end-user associated with the first computing device.

20 Claims, 6 Drawing Sheets

CUSTOM CONTENT INSERTION

BACKGROUND

Televisions and other display devices provide end-users an opportunity to view content delivered to their home through distribution networks. Content delivery can be organized into channels. On many channels, end-users are often provided advertisements that interrupt the regular content of interest to the end-user. In some cases, the same channel is distributed to different geographic regions to end-users who have different interests in addition to living in different locations. Such a distribution scheme may limit a content provider's ability to customize content to the end-user.

SUMMARY

It is to be understood that both the following general description and the following detailed description are exemplary and explanatory only and are not restrictive, as claimed.

Provided are methods and systems for inserting custom content. The method can comprise receiving, at a first computing device, an insertion instruction over a first non-packet-switching protocol information stream. The method can also comprise querying, by the first computing device, a second computing device in response to receiving the insertion instruction. The method can further comprise receiving, at the first computing device, content over a packet-switching protocol information stream in response to querying the second computing device. The content can be customized for an end-user associated with the first computing device.

In another aspect, the system can comprise a memory having encoded eon computer-executable instructions and data. The system can also comprise a processor functionally coupled to the memory and configured, by the computer-executable instructions, to perform at least the following actions: receiving, at a first computing device, an insertion instruction over a first non-packet-switching protocol information stream; querying, by the first computing device, a second computing device in response to receiving the insertion instruction; and receiving, at the first computing device, content over a packet-switching protocol information stream in response to querying the second computing device. The content can be customized for an end-user associated with the first computing device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
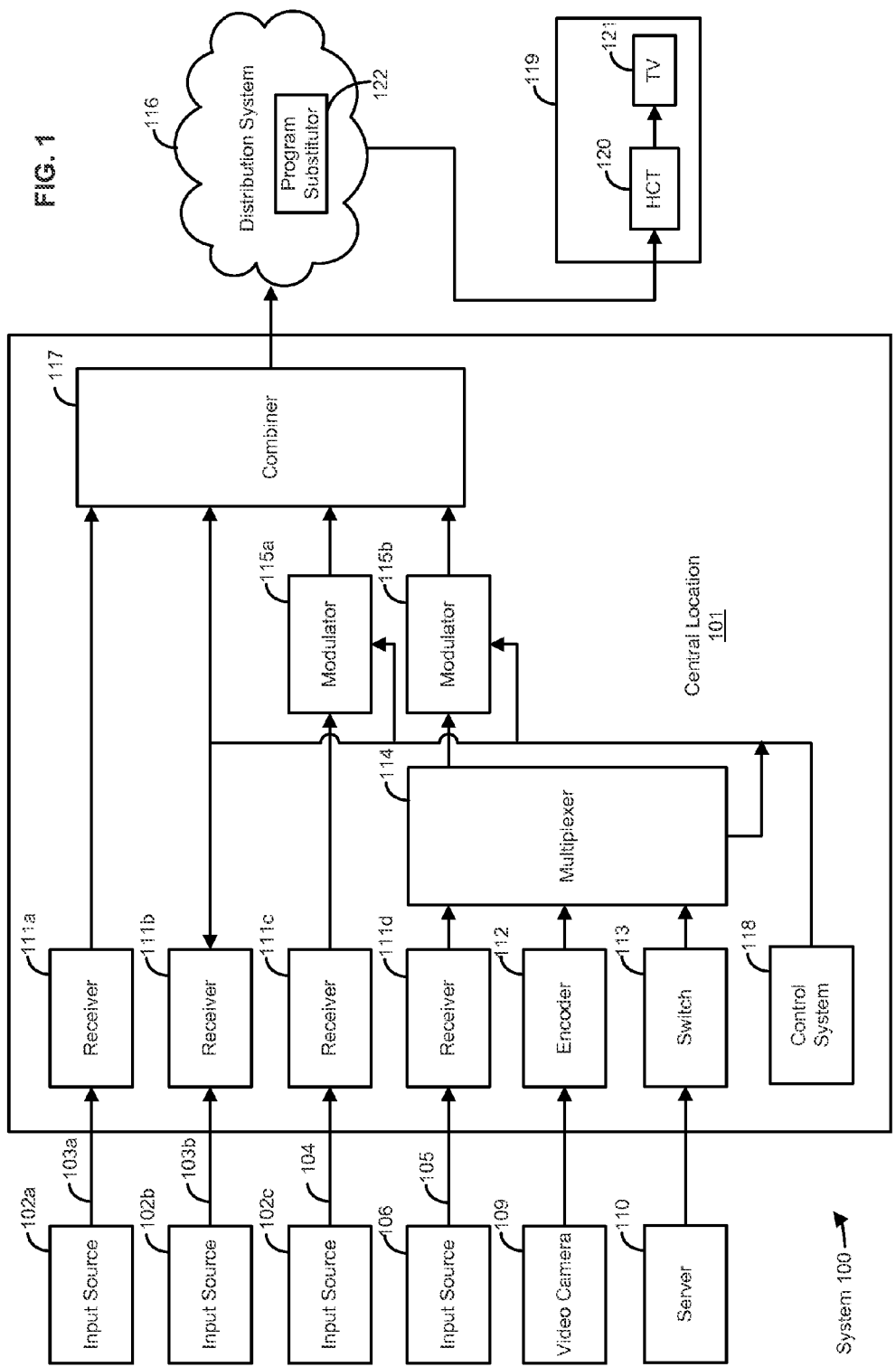
FIG. 1 is a block diagram illustrating various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment, "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, hut not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary system in which the present methods and systems can operate. The present disclosure recognizes and addresses, in one aspect, the issue of custom content insertion. In one aspect, the present disclosure relates to methods and systems for inserting custom content.

Provided are systems and methods for inserting custom content. The systems and methods can provide content distributors the ability to provide advertising content customized for each computing device used by an end-user. For example, an end-user can have multiple computing devices, each coupled to a different display, such as a television. One of the end-user's computing devices can be used primarily for viewing one type of content, such as content for children, and the other end-user's computer device can be used for viewing another type of content, such as general content. According to the end-user's preferences, national content, such as advertising, can be replaced by custom content relevant to the end-user. For example, a computing device configured for viewing content for children can receive advertising appropriate for children. More generally, end-users with different interests and/or from different geographic areas can receive content, such as advertising, customized for the particular end-user's interests or geographic area.

Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116. In one aspect, the system 100 can be implemented in the network hub 309 shown in FIG. 3.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a and 115b for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, and display or present the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within one or more devices at user location 119 such as one or more HCT's 120, TV's 121, DVR's, home theater PC's, and the like. Methods and systems can also be located within one or more servers 110. In an aspect, the one or more servers 110 can communicate directly with the one or more devices at user location 119 through a network described below.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of audio and video PESs. In addition to the compressed audio, video and data, a transport stream includes metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream (s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi-program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
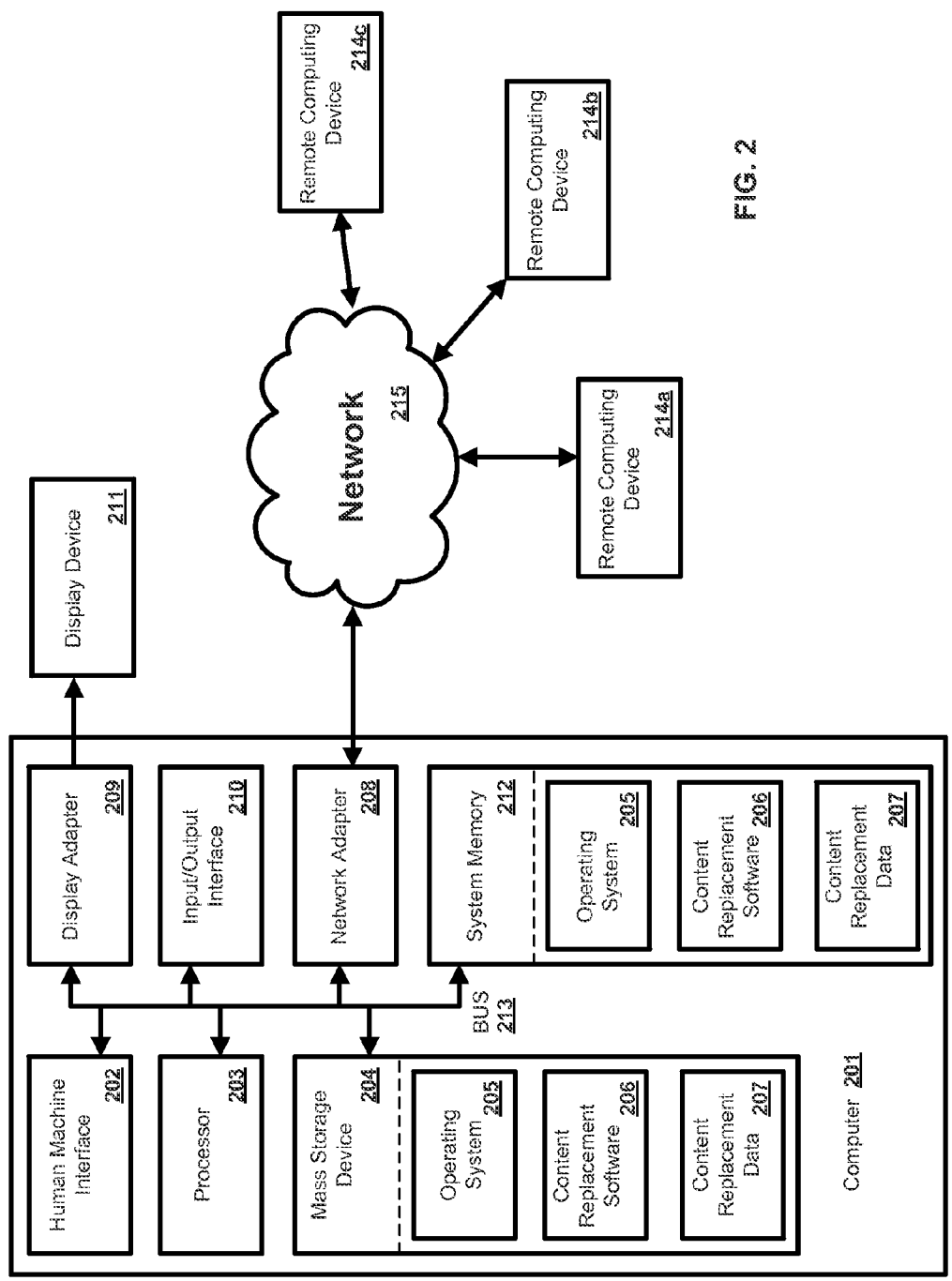
FIG. 2 is a block diagram illustrating an exemplary computing device in which the methods and systems can be implemented.

In an exemplary aspect, the methods and systems can be implemented on a computer 201 as illustrated in FIG. 2 and described below. By way of example, server 110 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, content replacement software 206, content replacement data 207, a network adapter 208, system memory 212, an Input/Output interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as content replacement data 207 and/or program modules such as operating system 205 and content replacement software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and content replacement software 206. Each of the operating system 205 and content replacement software 206 (or some combination thereof) can comprise elements of the programming and the content replacement software 206. Content replacement data 207 can also be stored on the mass storage device 204. Content replacement data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of content replacement software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
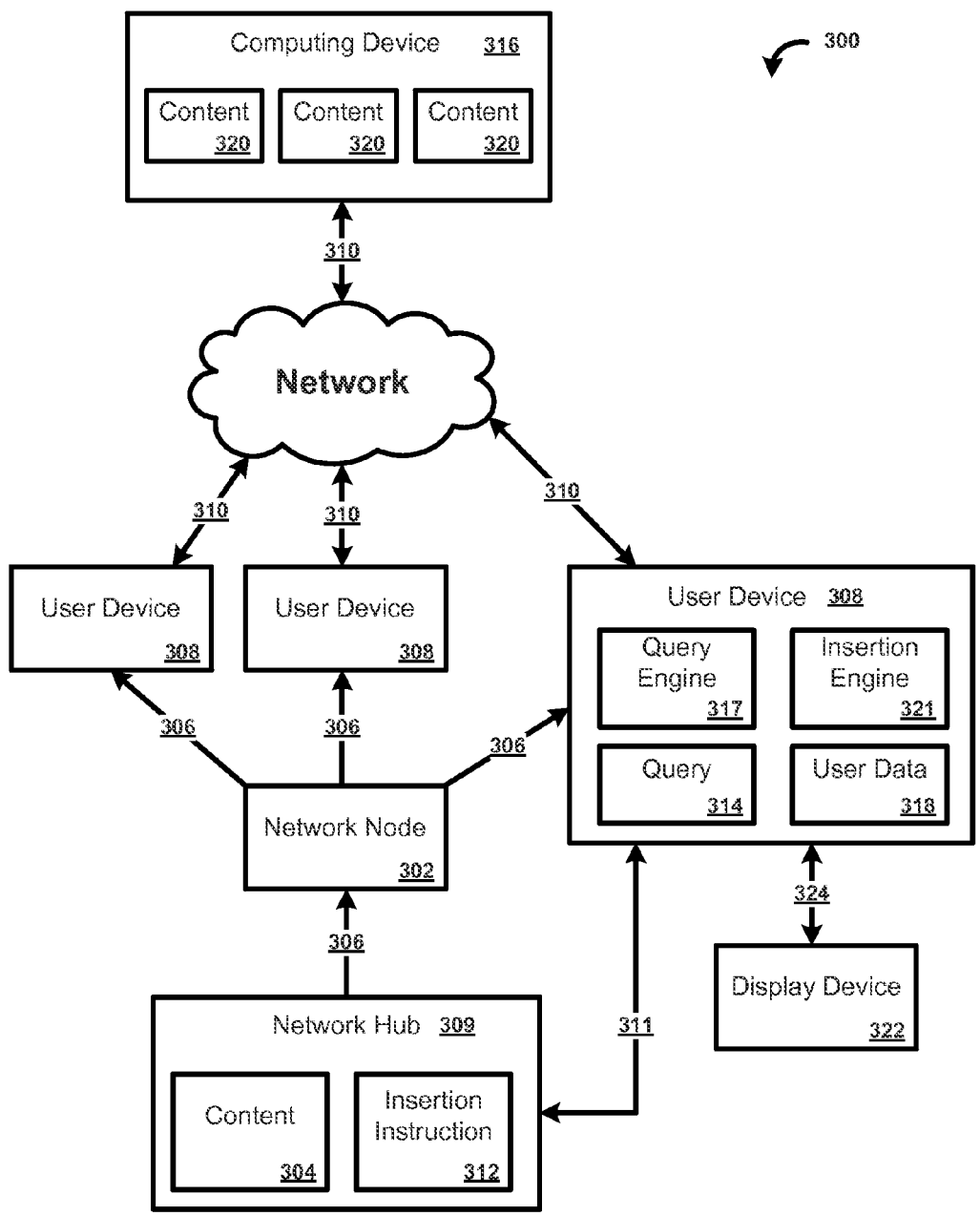
FIG. 3 is a block diagram illustrating an exemplary system for inserting custom content.

FIG. 3 is a block diagram illustrating an exemplary system 300 for inserting custom content. The system 300 can comprise a network node 302. In an aspect, the network node 302 can deliver or function as a hop in the delivery process of content 304 over a first non-packet-switching protocol information stream 306. For example, the first non-packet-switching protocol information stream 306 can comprise a quadrature amplitude modulation (QAM) transport stream (TS). Additionally, the QAM transport stream can be one of a realtime content TS or a time-shifted content TS.

In an aspect, the network node 302 can deliver content 304 to one or more user devices 308. The network node 302 can be configured to deliver content 304 to a region, such as one or more neighborhoods. In another aspect, the network node 302 can be configured to deliver content 304 to one or more residences or business locations. For example, the network node 302 can be configured to deliver content 304 to a large building having one or more residences or business.

In an aspect, the network node 302 can receive content 304 from a network hub 309. For example, the network hub 309 can comprise all or portions of system 100 at central location 101 described in FIG. 1. In one aspect, the network hub 309 can communicate with the user devices 308 through the first non-packet-switching protocol information stream 306, however, the network hub 309 can communicate to a variety of devices through a variety of information streams. For example, the network hub 309 can communicate to one or more of the user devices 308 through a first packet-switching protocol information stream 311, such as an internet protocol based information stream. The network node 302 can deliver the content 304 to the one or more user devices 308. In an aspect, the content 304 can comprise video, audio and/or other data. For example, the content 304 can be delivered as one or more television channels. The television channels can comprise television programs, advertisements, applications, supplemental content, and/or other data.

In another aspect, the user device 308 can comprise a computing device of an end-user. The user device 308 can be configured to receive content 304 from the network node 302. The end-user, for example, can be a customer of a content or service provider. The user device 308 can be configured to receive the content 304 delivered from the distribution system 116 of FIG. 1. For example, a user device 308 can be a gateway, a set top box, or a computing device configured to receive content from a first non-packet-switching protocol information stream 306 and a second packet-switching protocol information stream 310. In one aspect, the content 304 from the network node 302 can be received through the first non-packet-switching protocol information stream 306. The content 304 can be received by the user device 308 in an encoded format. The user device 308 can be configured to decode the content 304 received from the network node 302.

In an aspect, the user device 308 can also be configured to receive an insertion instruction 312 over the first non-packet-switching protocol information stream 306. In one aspect, the insertion instruction 312 can be embedded or otherwise included in the first non-packet-switching protocol information stream 306. For example, the insertion instruction 312 can be embedded in a QAM transport stream. In one aspect, the insertion instruction 312 can comprise an instruction to insert an advertisement into the content. For example, the insertion instruction 312 can communicate to the user device 308 a time length of content to replace, a start time of the content to replace, an end time of the content to replace, and the like. In an aspect, the insertion instruction 312 can be an SCTE-35 signal.

In an aspect, the user device 308 can be configured to transmit a query 314 to a computing device 316 (such as a server) in response to receiving the insertion instruction 312. The user device 308 can comprise a query engine 317 configured to formulate a query and communicate the query to the computing device 316. The query 314 can communicate to the computing device 316 information about the user device 308 and/or end-user to promote customization of content delivered to the end-user. For example, the query 314 can comprise user data 318 related to the end-user. The user data 318 can comprise demographic information such as age, gender, race, language, and geographic location. The user data 318 can also comprise user preferences. User preferences can include preferences for particular subject matter. For example, one end-user might prefer to view subject matter only related to one subject, such as automobiles, but another end-user might prefer to view content related to another subject, such as local restaurants and consumer electronic devices. User preferences can comprise preferences for a particular type of advertisement, such as humorous advertisements. Additionally, the query 314 can communicate other information collected from the device, such as a history of content viewed.

In one aspect, the computing device 316 can be configured to receive one or more queries 314 from the user device 308 requesting the computing device 316 to identify content 320. The user-device 308 can transmit the queries 314 to the computing device 316 through the second packet-switching protocol information stream 310. For example, the computing device 316 can be part of a content provider's network or a third party network. In an aspect, the computing device 316 can transmit identified content 320 to the user device 308 based on the query 314 received from the user device 308. In response to the one or more queries 314, the computing device 316 can transmit to the user device 308 content 320 identified by the computing device 316 that is customized for the end-user associated with the user device 308. For example, if a query 314 indicates a particular geographic region, the computing device 316 can select and transmit content 320 identified by the computing device 316 associated with the particular geographic region to the user device. Content 320 associated with a particular geographic region can be content related to a business in the geographic region or related to a business targeting the geographic region. If the query 314 indicates a particular subject matter, the computing device 316 can select and transmit content 320 identified by the computing device 316 associated with the particular subject matter or similar subject matter to the user device 308.

In one aspect, the content 320 identified by the computing device 316 can be transmitted through the second packet-switching protocol information stream 310. For example, the content 320 identified by the computing device 316 can be transmitted over an internet protocol (IP) information stream. The user device 308 can be configured to decode at least a portion of the second packet-switching protocol information stream 310. Once the content 320 is received from the computing device 316, the user device 308 can insert the content 320 into the content 304 received from the network node 302. The user device 308 can comprise an insertion engine 321 configured to insert the content 320 identified by the computing device 316 into the content 304 received from the network node. The insertion engine 321 can also be disposed elsewhere in the network. In one aspect, a portion of the content 304 from the network node 302 can be replaced by the content 320 identified by the computing device 316. For example, if the content 304 is an advertisement, an advertisement from the network node 302 can be replaced with an advertisement received from the computing device 316. The content from the network node 302 can be, for example, a national advertisement, while the content from the computing device 316 can be a local advertisement.

In another aspect, the user device 308 can be configured to transmit content to a display device 322. The user device 308 can reproduce the content over a second non-packet-switching protocol information stream 324. For example, the second non-packet-switching protocol information stream 324 can comprise a quadrature amplitude modulation transport stream. The display device 322 can comprise a television, a computer display, and/or other device capable of displaying the content to the end-user.

In one aspect, the user device 308 can be a device at user location 119 of FIG. 1. For example, the user device 308 can be an HCT 120 and the display device 322 can be a TV 121. Additionally, the user device 308 can be the computer 201 of FIG. 2. The content replacement software 206 can comprise the query engine 317. The content replacement software 206 can also comprise the insertion engine 321. The content replacement software 206 can also comprise other software useful in replacing, inserting, encoding, decoding, receiving, transmitting and/or displaying content 320 identified by the computing device 316 and content 304 received from the network node 302. The content replacement data 207 can comprise one or more queries 314. The content replacement data 207 can comprise user data 318. Additionally, the content replacement data 207 can comprise other data useful in replacing, inserting, encoding, decoding, receiving, transmitting and/or displaying content 320 identified by the computing device 316 and content 304 received from the network node 302.

It should be noted that in some implementations, the user device 308 can receive the content 320 from the computing device 316. For example, the insertion instruction 312 can be located at and provided from the computing device 316. Then, the query engine 317 can query the network hub 309 through the first packet-switching protocol information stream 311. In response, the network hub 309 can provide content 304 to the user device 308 through the first packet-switching protocol information stream 311 and/or the first non-packet-switching protocol information stream 306. The content 304 can be customized for the user at the user device 308. Accordingly, the insertion engine 321 can insert into the content 320 received from the computing device 316 the content 304 received from the network hub 309. Additionally, the insertion engine 321 can replace the content 320 received from the computing device 316 with the content 304 received from the network hub 309.

In another aspect, the insertion engine 321 can replace (or, for example, insert) content received from the network hub 309 through the first non-packet switching protocol information stream 306 with content received from the network hub 309 through the first packet-switching protocol information stream 311.

Figure 4:
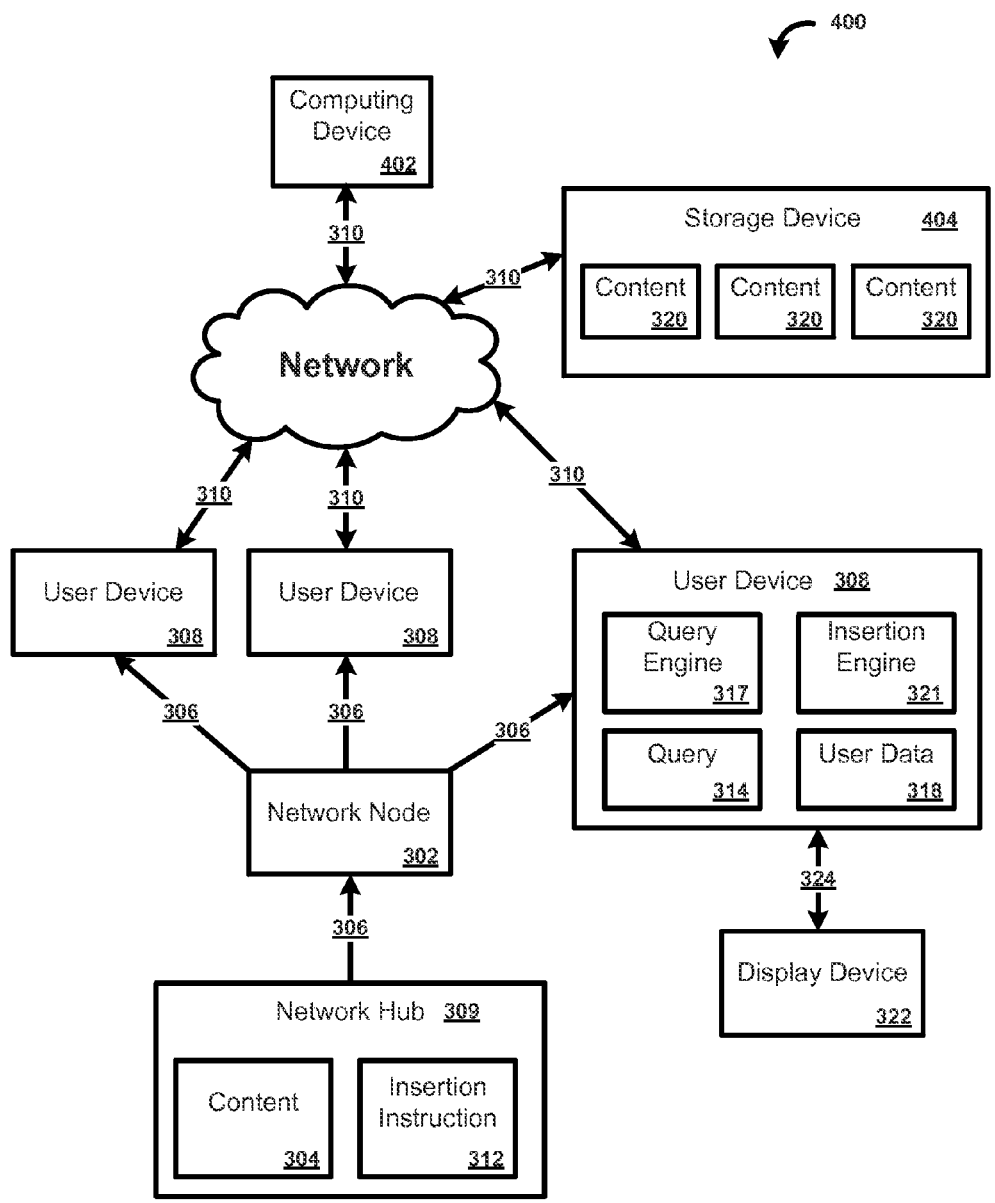
FIG. 4 is a block diagram illustrating another exemplary system for inserting custom content.

FIG. 4 is a block diagram illustrating another exemplary system 400 for inserting custom content. In the system 400, the user device 308 can communicate a query to the computing device 402. In response, the computing device 402 can transmit to the user device 308 a logical address indicative of a source of the content 320 identified by the computing device 402. In an aspect, the logical address of the source of the content can comprise a universal resource locator (URL) indicative of the source of the content. For example, the source of the content can be located on a storage device 404, and the URL can comprise an IP address of the storage device 404 having the content. The URL can also comprise additional characters indicating the location of the content on the storage device 404. The user device 308 can retrieve at least a portion of content 320 from the source of the content on the storage device 404. After retrieving the content 320 from the storage device 404, the user device 308 can insert the content 320 into content 304 received from the network node 302.

Figure 5:
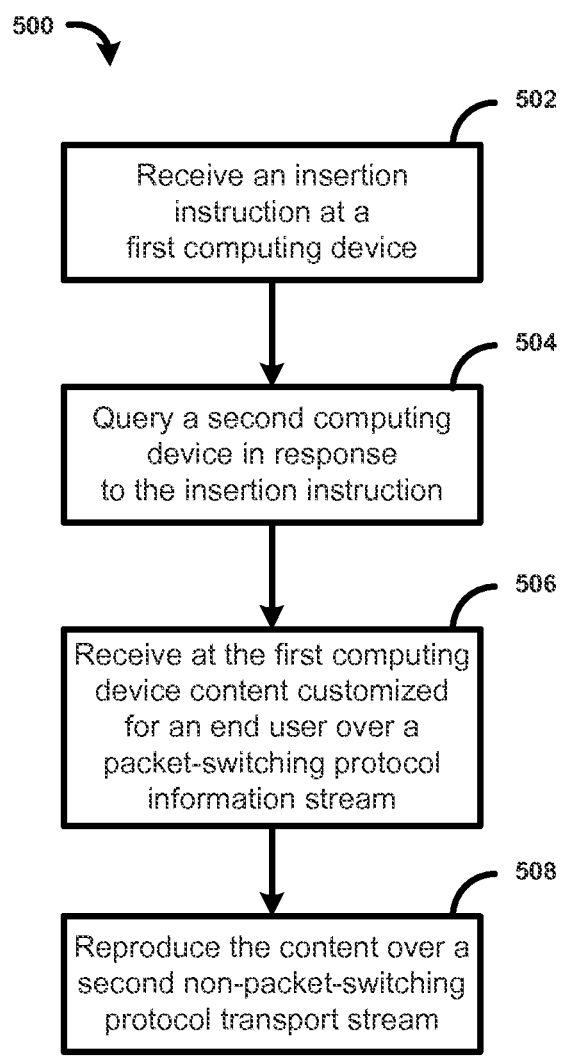
FIG. 5 is a flow chart diagram illustrating an exemplary method for inserting custom content.

FIG. 5 is a flow chart diagram illustrating an exemplary method 500 for inserting custom content. In step 502, an insertion instruction can be received, at a first computing device, over a first non-packet-switching protocol information stream. In an aspect, receiving the insertion instruction can comprise receiving a quadrature amplitude modulation (QAM) transport stream (TS) having the insertion instruction embedded therein. Additionally, the QAM transport stream can be one of a realtime content TS or a time-shifted content TS. In step 504, a second computing device can be queried, by the first computing device, in response to receiving the insertion instruction, which may be an advertisement insertion signal. In step 506, content can be received, at the first computing device, over a packet-switching protocol information stream in response to querying the second computing device. In an aspect, the content can be customized for an end-user associated with the first computing device. In another aspect, content can be received over an internet protocol (IP) information stream. In step 508, the content can be made part of (e.g., embedded), or reproduced, over a second non-packet-switching protocol information stream. In an aspect, the content can comprise one of local advertisement content or nationwide advertisement content. The reproducing action of step 508 can comprise reproducing the content over a quadrature amplitude modulation transport stream.

Figure 6:
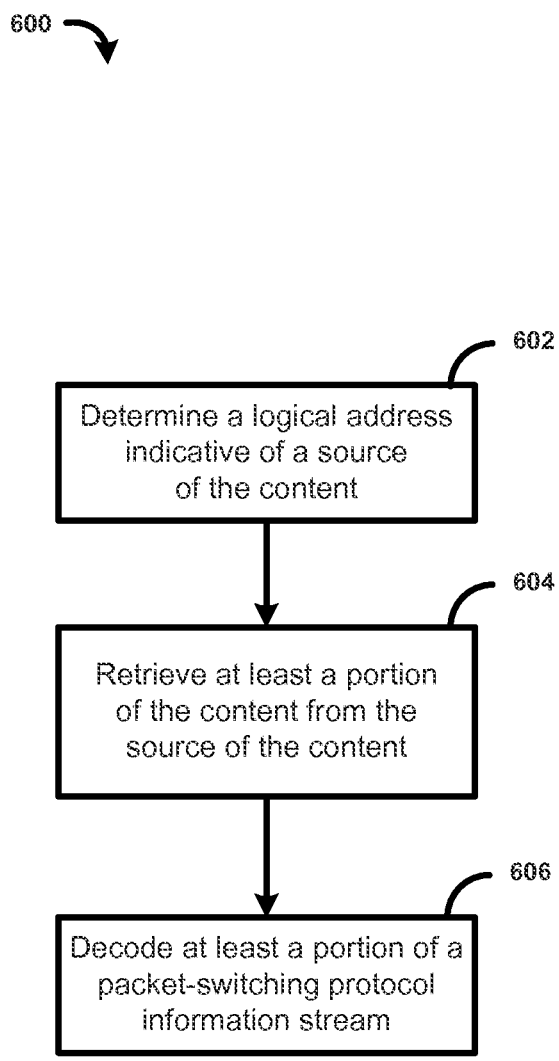
FIG. 6 is a flow chart diagram illustrating another exemplary method for inserting custom content.

FIG. 6 is a flow chart diagram illustrating an exemplary method 600 for inserting custom content. In one aspect, the method 600 can implement at least a part of step 506 of method 500. In step 602, a logical address indicative of a source of the content can be received or otherwise determined. In one aspect, receiving the logical address of the source of the content can comprise receiving a universal resource locator (URL) indicative of the source of the content. In step 604, at least a portion of the content can be retrieved from the source of the content. For example, the content can be retrieved over a packet-switching protocol information stream. The content can be customized for an end-user associated with the first computing device. In step 606, at least a portion of the packet-switching protocol information stream can be decoded.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, at a first computing device, an insertion instruction over a first non-packet-switching protocol information stream;
   querying, by the first computing device, a second computing device in response to receiving the insertion instruction; and
   receiving, at the first computing device, content over a packet-switching protocol information stream in response to querying the second computing device, the content being customized for an end-user associated with the first computing device.

2. The method of claim 1, further comprising reproducing the content over a second non-packet-switching protocol information stream.

3. The method of claim 2, wherein reproducing the content over the second non-packet-switching protocol information stream comprises reproducing the content over a quadrature amplitude modulation transport stream.

4. The method of claim 1, wherein receiving the content comprises decoding at least a portion of the packet-switching protocol information stream.

5. The method of claim 1, wherein the packet-switching protocol information stream comprises an internet protocol information stream.

6. The method of claim 1, wherein receiving the content comprises receiving a logical address indicative of a source of the content.

7. The method of claim 6, wherein receiving the content comprises retrieving at least a portion of the content from the source of the content.

8. The method of claim 6, wherein receiving the logical address indicative of the source of the content comprises receiving a universal resource locator indicative of the source of the content.

9. The method of claim 1, wherein the first non-packet-switching protocol information stream comprises a quadrature amplitude modulation transport stream comprising the insertion instruction, and wherein the quadrature amplitude modulation transport stream comprises one of a real time content transport stream or a time-shifted content transport stream.

10. The method of claim 1, wherein the insertion instruction comprises an instruction to insert an advertisement in to the content.

11. A system, comprising:
    a memory having encoded thereon computer-executable instructions; and
    a processor functionally coupled to the memory and configured, by the computer-executable instructions, for,
        receiving an insertion instruction over a first non-packet-switching protocol information stream,
        querying a second computing device in response to receiving the insertion instruction, and
        receiving content over a packet-switching protocol information stream in response to querying the second computing device, the content being customized for an end-user associated with the first computing device.

12. The system of claim 11, wherein the processor is further configured for reproducing the content over a second non-packet-switching protocol information stream.

13. The system of claim 12, wherein the second non-packet-switching protocol information stream comprises a quadrature amplitude modulation transport stream.

14. The system of claim 11, wherein the packet-switching protocol information stream comprises an internet protocol information stream.

15. The system of claim 11, wherein the receiving the content comprises receiving a logical address indicative of a source of the content.

16. The system of claim 15, wherein receiving the content comprises retrieving at least a portion of the content from the source of the content.

17. The system of claim 15, wherein receiving the logical address indicative of the source of the content comprises receiving a universal resource locator indicative of the source of the content.

18. The system of claim 11, wherein the first non-packet-switching protocol information stream comprises a quadrature amplitude modulation transport stream comprising the insertion instruction, and wherein the quadrature amplitude modulation transport stream comprises one of a realtime content transport stream or a time-shifted content transport stream.

19. The system of claim 11, wherein the insertion instruction comprises an instruction to insert an advertisement in to the content.

20. A method, comprising:
    receiving, at a first computing device, an insertion instruction over a non-packet-switching protocol information stream;
    determining a logical address indicative of a source of content;
    retrieving at least a portion of the content from the source of the content over a packet-switching protocol information stream, wherein the content is customized for an end-user associated with the first computing device; and
    decoding at least a portion of the packet-switching protocol information stream.

* * * * *